United States Patent Office.

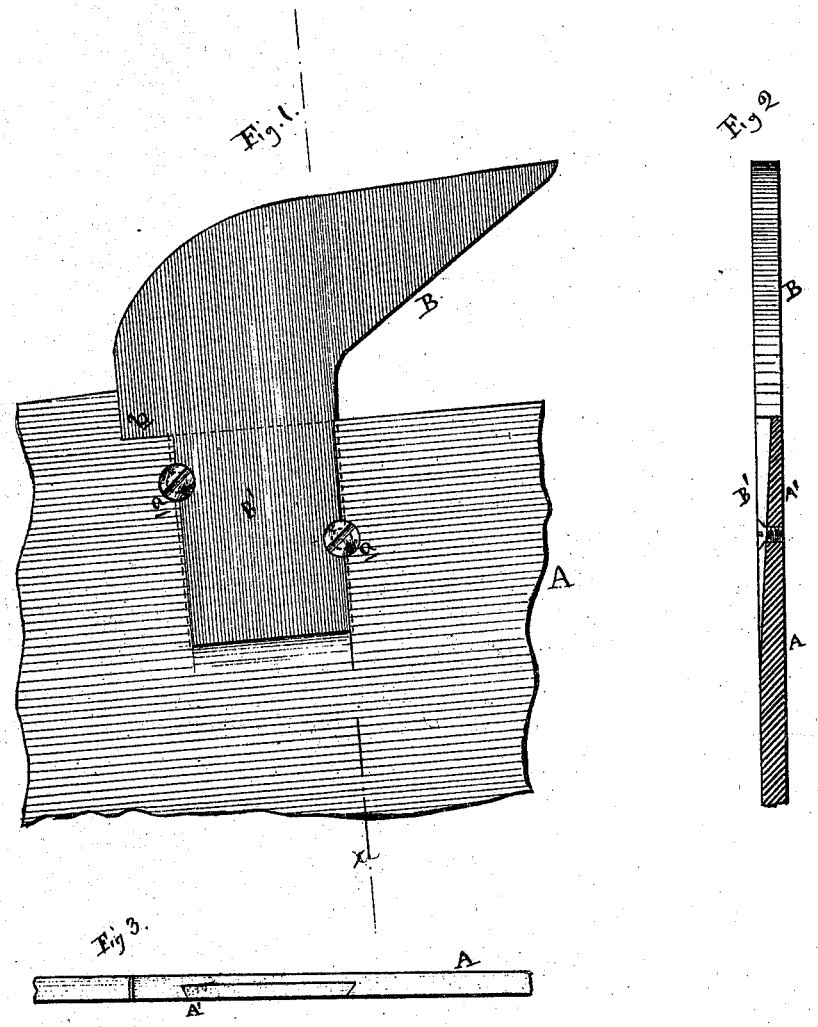

GEORGE L. HILES, OF CHICAGO, ILLINOIS.

Letters Patent No. 103,045, dated May 17, 1870.

IMPROVEMENT IN SAW-TEETH.

The Schedule referred to in these Letters Patent and making part of the same.

*To whom it may concern:*

Be it known that I, GEORGE L. HILES, of Chicago, in the county of Cook and State of Illinois, have invented a new and useful Improvement in Movable-toothed Saws; and I do declare that the following is a true and accurate description thereof, reference being had to the accompanying drawings and to the letters of reference marked thereon, and being a part of this specification, in which—

Figure 1 is an elevation of a section of a saw-plate with the tooth inserted;

Figure 2 is a vertical transverse section on the line $x\ x$ in fig. 1, showing the outline of the base of the tooth and the recess in the plate; and Figure 3 is a horizontal section on the line $y\ y$ in fig. 1.

Similar letters of reference indicate corresponding parts in each figure.

The nature of my invention relates to an improvement in the construction of movable saw-teeth and method of securing them to the saw-plate.

It consists in the peculiar conformation of the tooth and a corresponding recess in the saw-plate, as more fully hereinafter set forth.

In the drawings—

A represents a saw-plate, having formed in its edge or periphery, at proper intervals apart, the inclined or beveled recesses A', for the purpose of more securely holding the tooth therein. The edges of the recess are half dovetailed, as shown in fig. 3.

B is a tooth of any approved form, having a base, B', formed to enter and accurately fit the recess A', where it is held by the machine screws $a$, countersunk in and passing through tooth and plate. They may be either "halved in" at the edges of the tooth, or inserted through its body. The back part of the tooth is formed with a shoulder, $b$, which rests against the solid plate at the point where the greatest strain is exerted thereon.

The recesses A' are not sockets in the periphery of the saw, where the metal of the plate is cut entirely away for the reception of the tooth, as in inserted tooth-saws of the styles heretofore made, but are made in the side of the plate, and nearly parallel therewith, and may be more or less inclined as they approach the periphery of the plate, or, if preferred, they may be parallel, and the bases of the teeth "halved" in.

Saws having teeth inserted therein or secured thereto in the manner described, may, with great advantage to their cutting capacity, have their teeth "set," instead of swaging their points to give them clearance, especially in sawing soft timber. The "set" of the teeth will be better obtained if the plate be recessed and the teeth inserted on alternate slides.

It is well known that the chief strain on a circular saw, when at work, is on its periphery, and by cutting sockets in it for the reception of teeth, as in the manner heretofore practiced, it is very materially weakened, while in the formation of the recesses, in the manner above described, the strength of the plate is almost unimpaired. In striking a hard foreign substance in the timber being sawn, the fracture, should any occur, will happen to the tooth, which can be readily replaced at a small cost.

The use of screws in the place of rivets, in vogue, is equally advantageous, as, unless the rivets are inserted with the greatest care by a practiced hand, they will strain the plate so as to induce an easy fracture, or the teeth will not be well secured in position, while the screws may be inserted by any one without endangering the safety of the plate.

This method of inserting the teeth is equally applicable to reciprocating as to circular saws.

If desired, the shoulder $b$ of the tooth, and that part of the plate in contact with it, may be tongued and grooved together.

What I claim as my invention, and desire to secure by Letters Patent, is—

1. The recesses A' in the same or alternate sides of the peripheries thereof, for the reception of movable teeth, substantially as described.

2. In combination with the recesses A', the movable teeth B, provided with bases B', corresponding in form with said recesses, and secured therein, substantially as described, for the purpose set forth.

GEORGE L. HILES.

Witnesses:
H. F. EBERTS,
SAML. B. BELL.